H. ALTENBRAND.
MALT-KILN.
No. 189,678. Patented April 17, 1877.
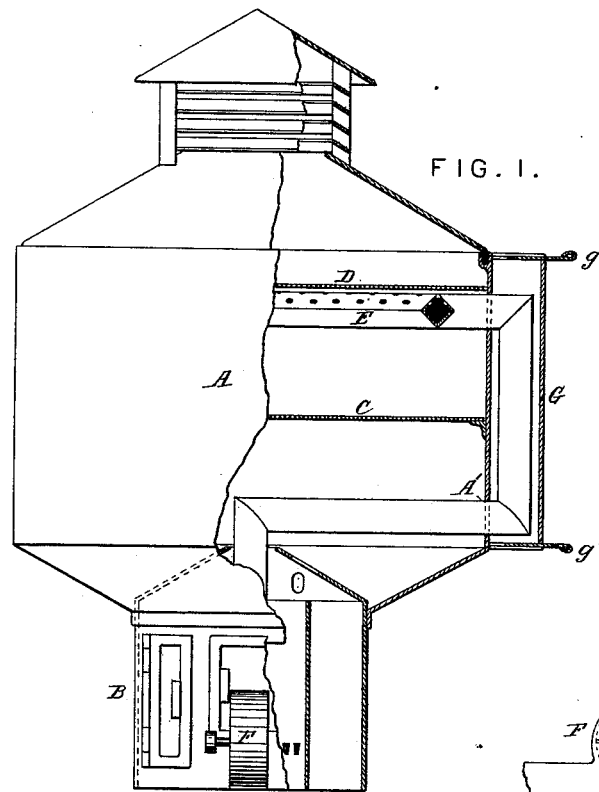
FIG. 1.
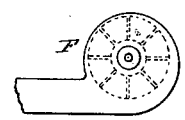
FIG. 3.
FIG. 2.
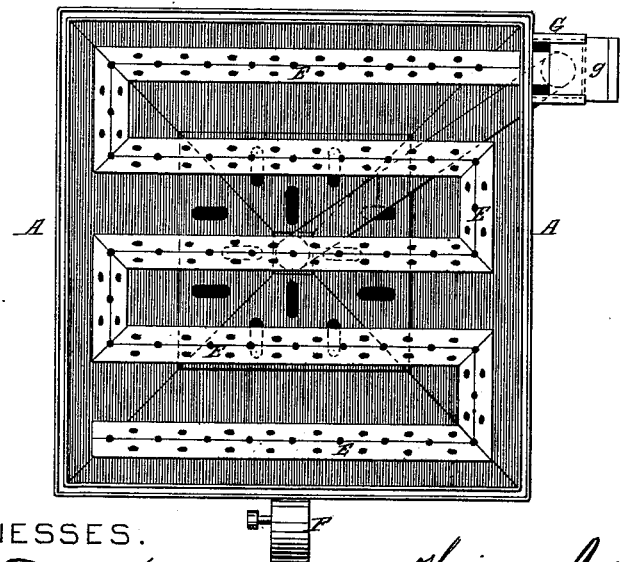
WITNESSES.
Boyd Eliot
Wm A. Hutchinson
Henry Altenbrand
INVENTOR.

UNITED STATES PATENT OFFICE.

HENRY ALTENBRAND, OF BROOKLYN, E. D., NEW YORK.

IMPROVEMENT IN MALT-KILNS.

Specification forming part of Letters Patent No. 189,678, dated April 17, 1877; application filed January 16, 1877.

*To all whom it may concern:*

Be it known that I, HENRY ALTENBRAND, of the city of Brooklyn, E. D., county of Kings and State of New York, have invented a new and useful Improvement in Malt-Kilns, of which the following is a clear and exact description, when taken in connection with the accompanying drawings, in which—

Figure 1 is a side elevation of the kiln with a portion of the outer wall removed to show the interior construction. Fig. 2 is a plan of the heating-pipes under the upper floor; and Fig. 3 is a side elevation of the fan to cause circulation in the heating-pipe, as will hereinafter appear.

The object of this invention is to dry the malt as quickly as possible without scorching the grain, and to keep it in constant agitation by the use of a strong blast of air up through the floor, which also assists greatly in carrying off the moisture; and the invention consists in combining, with the kiln, and immediately underneath the first drying-floor thereof, a perforated tube or pipe, one end of which passes through the furnace or a heating-chamber, and which is provided with a fan or other means of circulating air through said tube, whereby it may be forced up through the malt, and not only carry off the moisture, but by its lifting action keep the grain on the floor in constant agitation, to thoroughly stir it without the expense of costly apparatus for such purposes.

At A is represented the wall of the kiln proper, and at B is shown the furnace, of the ordinary construction. At C is shown the lower drying-floor, and at D is the upper drying-floor. These are made in the usual manner, and of the ordinary materials for such purposes; but close underneath the upper floor there is placed a tube or pipe, as at E, extending back and forth over the entire space, or as much as is required to do the work, and said pipe is provided with numerous holes or perforations on the upper side, to permit the escape of air, which is driven in at one end of said pipe by a fan or blower of some kind, as shown at F, and which is driven by any suitable power. The end of the perforated pipe at which the air enters is conducted through the furnace or some heating apparatus, in order to heat the air before it reaches the malt on the upper floor. In the present case said pipe is shown as carried directly up through the furnace of the kiln, and is then carried over to one side, and out through the outer wall, as at A', and thence in a vertical direction up through a tube, as at G, fastened upon the outer wall of the kiln, where it is again returned to the space under the upper floor. The tube G is open at both ends, and provided with valves or slides, as at $g$ and $g'$, to regulate the draft through the tube G.

The object of the tube G is to serve as a cooler around the hot-air pipe, so that, if at any time the heat on the upper floor may be found too great, the dampers $g$ and $g'$ may be opened, and a cold current of air caused to surround the pipe E, and thereby reduce the temperature therein.

The lower floor is constructed in the ordinary manner, and is heated from the air rising directly from the furnace, which ascends on up through the other floor, and co-operates with the heated air from the pipe, and which is forced up by the fan.

Instead of a fan placed at the lower end of the pipe E an exhauster may be placed in the top of the kiln, to draw the air up through the pipe E, and also through the floors, and this, it is evident, would have the same effect to keep the malt in constant agitation.

The operation will now be readily understood. The wet malt is first placed on the upper floor and evenly spread over the entire surface, and the hot blast is then turned on, the temperature being regulated by the cooling-tube G and its dampers $g$ and $g'$, or some similar devices, and, as the malt becomes dry on the under side, the agitation of the air through it will gradually carry up the dry grains, which will be lighter than the wet, and allow the wet to settle down toward the floor until the whole mass will be dried to a sufficient degree to be dropped to the next floor, where a much greater heat may be applied to complete the operation.

I therefore claim—

1. In combination with the perforated floor of a malt-kiln, a perforated pipe for conducting air under pressure underneath the malt from a furnace and blower or exhauster, in order that the malt may be agitated by the circulation of the air, substantially as described.

2. The combination of the malt-kiln and hot-air pipe E, cooling-tube G, and dampers for regulating the circulation of the currents of air, substantially as described.

3. The combination of the fan and hot-air pipe with the furnace of a malt-kiln, whereby the malt is kept in agitation, substantially as described.

HENRY ALTENBRAND.

Attest:
BOYD ELIOT,
WM. A. HUTCHINSON.